US011855456B2

(12) United States Patent
Ha et al.

(10) Patent No.: US 11,855,456 B2
(45) Date of Patent: Dec. 26, 2023

(54) METHOD OF CONTROLLING CHARGING OF PLURALITY OF BATTERIES AND ELECTRONIC DEVICE TO WHICH THE SAME IS APPLIED

(71) Applicant: Samsung Electronics Co., Ltd., Suwon-si (KR)

(72) Inventors: Youngmi Ha, Suwon-si (KR); Duhyun Kim, Suwon-si (KR); Seungbeom Kang, Suwon-si (KR); Kyounghoon Kim, Suwon-si (KR); Byungwook Kim, Suwon-si (KR); Kwanbae Son, Suwon-si (KR); Sungjoon Cho, Suwon-si (KR); Hansol Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 16/738,404

(22) Filed: Jan. 9, 2020

(65) Prior Publication Data

US 2020/0266627 A1 Aug. 20, 2020

(30) Foreign Application Priority Data

Feb. 19, 2019 (KR) .......................... 10-2019-0019470

(51) Int. Cl.
*H02J 7/00* (2006.01)
*H02J 1/10* (2006.01)
(Continued)

(52) U.S. Cl.
CPC .............. *H02J 1/106* (2020.01); *B60L 58/22* (2019.02); *H02J 1/14* (2013.01); *H02J 7/0014* (2013.01);
(Continued)

(58) Field of Classification Search
USPC ......................................................... 320/126
See application file for complete search history.

(56) References Cited

U.S. PATENT DOCUMENTS 6,975,094 B1 * 12/2005 Lascaud ................ H02J 7/0016
320/122
7,973,515 B2 7/2011 Densham et al.
(Continued)

FOREIGN PATENT DOCUMENTS

CN 101262079 A 9/2008
CN 104052075 A 9/2014
(Continued)

OTHER PUBLICATIONS

European Search Report dated Jun. 17, 2021; European Appln. No. 20 156 941.5-1202.
(Continued)

*Primary Examiner* — Arun C Williams
(74) *Attorney, Agent, or Firm* — Jefferson IP Law, LLP

(57) ABSTRACT

A method of controlling charging of a plurality of batteries and an electronic device to which the same is applied are provided. The electronic device includes a housing, a plurality of batteries arranged in the housing, a power management module that controls the plurality of batteries, a plurality of current limiting ICs that limits a maximum intensity of a current flowing into each of the plurality of batteries, and at least one processor operationally connected to the plurality of batteries, the power management module and the plurality of current limiting ICs. The at least one processor may set a total charging current output from the power management module, set an individual charging current flowing into each of the plurality of batteries in proportion to a total capacity of each of the plurality of (Continued)

batteries, and recalculate the individual charging currents when the total charging current changes.

19 Claims, 9 Drawing Sheets

(51) Int. Cl.
*H02J 1/14* (2006.01)
*B60L 58/22* (2019.01)

(52) U.S. Cl.
CPC ........ *H02J 7/0016* (2013.01); *H02J 7/00718* (2020.01)

(56) References Cited

U.S. PATENT DOCUMENTS

| | | | |
|---|---|---|---|
| 8,111,038 B2 | 2/2012 | Wang et al. | |
| 8,222,870 B2 | 7/2012 | Guo et al. | |
| 9,048,668 B2 * | 6/2015 | Kabasawa | H02J 7/0018 |
| 9,548,619 B2 | 1/2017 | Gazit | |
| 10,439,404 B2 | 10/2019 | Shen et al. | |
| 10,778,025 B2 | 9/2020 | Gazit | |
| 2008/0218127 A1 | 9/2008 | Kao et al. | |
| 2010/0201317 A1 * | 8/2010 | Shiu | H02J 7/0018 320/116 |
| 2014/0265606 A1 | 9/2014 | Gazit | |
| 2017/0163060 A1 * | 6/2017 | Zheng | H02J 7/0019 |
| 2017/0201113 A1 | 7/2017 | Gazit | |
| 2017/0294790 A1 * | 10/2017 | Tian | H02J 7/04 |
| 2017/0310120 A1 | 10/2017 | Birkl et al. | |
| 2018/0301912 A1 | 10/2018 | Shen et al. | |
| 2019/0006722 A1 * | 1/2019 | Kim | H01M 10/425 |
| 2020/0251920 A1 | 8/2020 | Ha et al. | |
| 2021/0013727 A1 | 1/2021 | Gazit | |
| 2022/0393471 A1 | 12/2022 | Gazit | |

FOREIGN PATENT DOCUMENTS

| | | | |
|---|---|---|---|
| EP | 2 523 303 A2 | 11/2012 | |
| EP | 2 779 348 A2 | 9/2014 | |
| JP | H0935758 A * | 7/1995 | |
| JP | 2007-166847 A | 6/2007 | |
| JP | 2008-220149 A | 9/2008 | |
| JP | 2011-130575 A | 6/2011 | |
| KR | 10-2004-0063668 A | 7/2004 | |
| KR | 10-2020-0094926 A | 8/2020 | |
| WO | WO-2013027113 A1 * | 2/2013 | B60L 11/1816 |
| WO | 2018/191087 A1 | 10/2018 | |

OTHER PUBLICATIONS

European Search Report dated Sep. 24, 2020; European Appln. No. 20156941.5-1202 / 3700047.

European Search Report dated Jul. 2, 2020; European Appln. No. 20156941.5-1202.

International Search Report with Written Opinion dated Apr. 24, 2020; International Appln. No. PCT/KR2020/000232.

Chinese Office Action dated Oct. 23, 2023, issued in Chinese Application No. 202080015634.8.

* cited by examiner

METHOD OF CONTROLLING CHARGING OF PLURALITY OF BATTERIES AND ELECTRONIC DEVICE TO WHICH THE SAME IS APPLIED

CROSS-REFERENCE TO RELATED APPLICATION(S)

This application is based on and claims priority under 35 U.S.C. § 119(a) of a Korean patent application number 10-2019-0019470, filed on Feb. 19, 2019, in the Korean Intellectual Property Office, the disclosure of which is incorporated by reference herein its entirety.

BACKGROUND

1. Field

The disclosure relates to a method of controlling charging of a plurality of batteries and a technology for implementing an electronic device to which the method is applied.

2. Description of the Related Art

When an electronic device is connected to an external power source, a battery may be charged. When the electronic device has a plurality of batteries, the plurality of batteries may be charged at the same time. When charging, each of the plurality of batteries may individually change in battery voltage, and a voltage difference may occur between the plurality of batteries. Battery cell balancing may occur between the plurality of batteries to balance the voltages of the batteries. The battery cell balancing is a phenomenon in which a high voltage battery is discharged and a low voltage battery is charged to reduce a voltage difference between batteries connected in parallel. Due to the battery cell balancing, current may flow from the battery with a higher voltage toward the battery with a lower voltage.

Even if voltage imbalance between a plurality of batteries occurs while charging the plurality of batteries, an electronic device of the related art does not separately manage the voltage imbalance between the plurality of batteries. When there is a difference between voltages between the plurality of batteries, battery cell balancing may cause capacity loss between the plurality of batteries and accelerate battery deterioration. The battery cell balancing phenomenon may continuously cause charge and discharge between the batteries, which may cause a rapid deterioration of the battery life.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method of minimizing a voltage difference between a plurality of batteries during charging by distributing a charging current corresponding to a capacity of each of the plurality of batteries when charging a plurality of batteries, and an electronic device to which the method is applied.

Another aspect of the disclosure is to provide a method of minimizing battery life degradation that occurs due to battery cell balancing by variably minimizing a battery voltage difference corresponding to a charging mode to perform charging while minimizing battery cell balancing when a voltage difference occurs between a plurality of batteries when charging a plurality of batteries, and an electronic device to which the method is applied.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a plurality of batteries arranged in the housing, a power management module that controls the plurality of batteries, a plurality of current limiting integrated circuits (ICs) that limits a maximum intensity of a current flowing into each of the plurality of batteries, and at least one processor operationally connected to the plurality of batteries, the power management module and the plurality of current limiting ICs. The at least one processor may set a total charging current output from the power management module, set an individual charging current flowing into each of the plurality of batteries in proportion to a total capacity of each of the plurality of batteries, and recalculate the individual charging currents when the total charging current changes.

In accordance with another aspect of the disclosure, an electronic device is provided. The electronic device includes a housing, a plurality of batteries arranged in the housing, a power management module that controls the plurality of batteries, a plurality of current limiting ICs that limits a maximum intensity of a current flowing into each of the plurality of batteries, and at least one processor operationally connected to the plurality of batteries, the power management module and the plurality of current limiting ICs. The at least one processor may sense a voltage of the power management module and a voltage of each of the plurality of batteries, determine whether a mode is a first mode in which voltages of the plurality of batteries are kept constant or a second mode in which a current is kept constant, based on the voltage of the power management module, and control a charging current of a battery having a higher voltage among the plurality of batteries corresponding to whether the mode is the first mode or the second mode when a voltage difference occurs while the plurality of batteries are charged.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
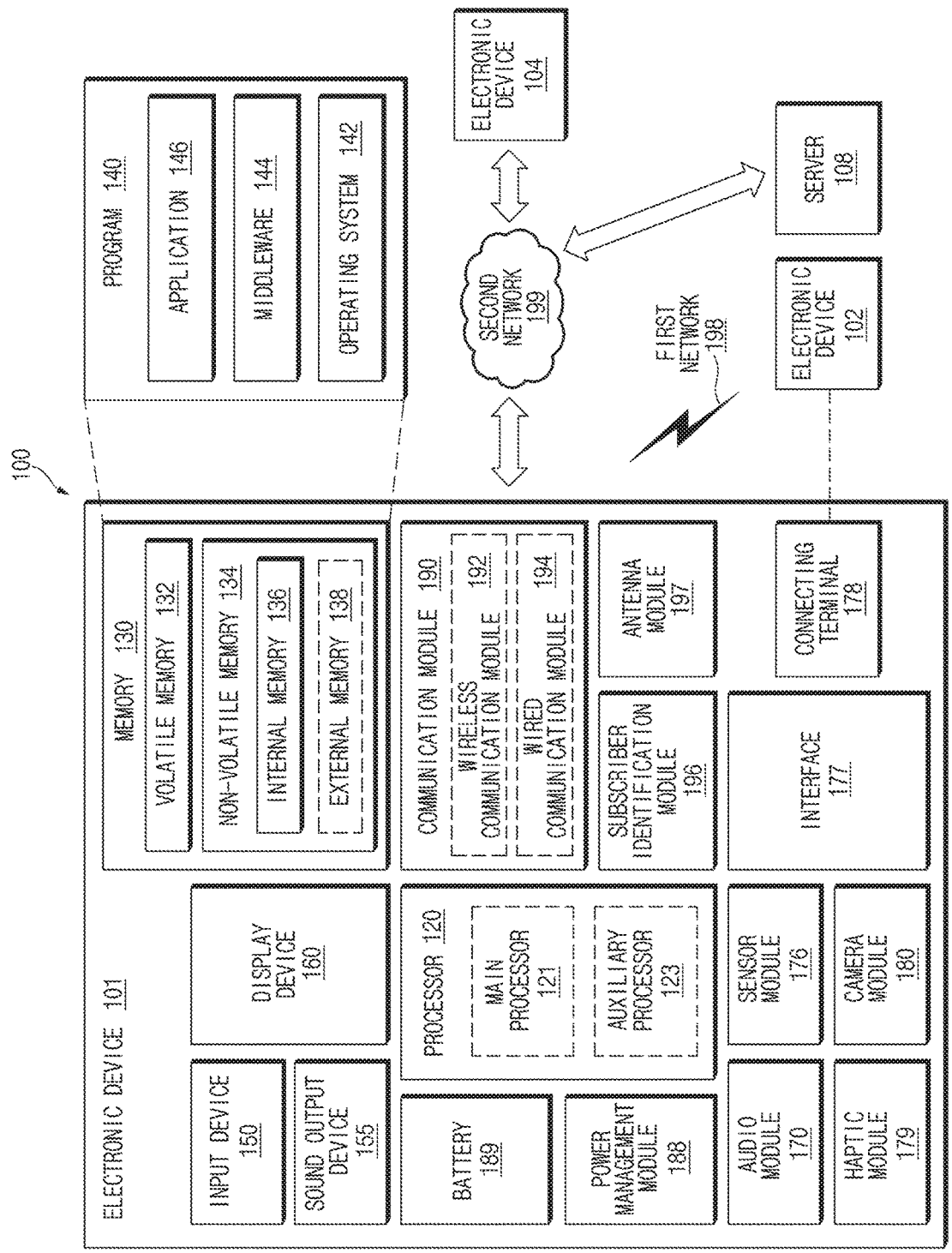
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include one or more of an internal memory 136 and an external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
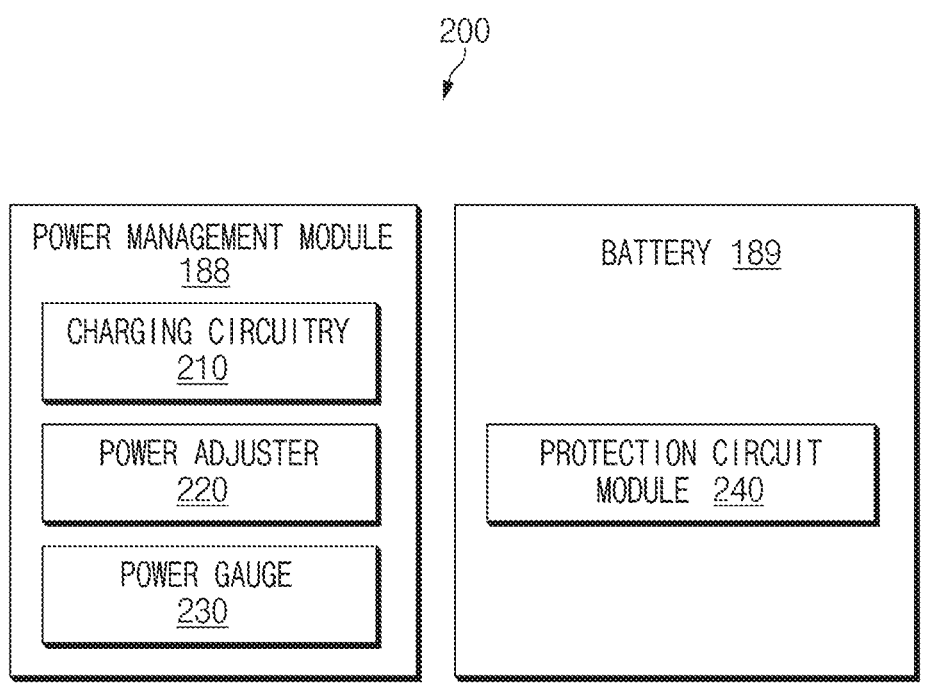
FIG. 2 is a block diagram illustrating a power management module and battery according to an embodiment of the disclosure.

FIG. 2 is a block diagram illustrating a power management module and battery according to an embodiment of the disclosure.

Referring to FIGS. 1 and 2, block diagram 200 illustrates that the power management module 188 may include charging circuitry 210, a power adjuster 220, and/or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
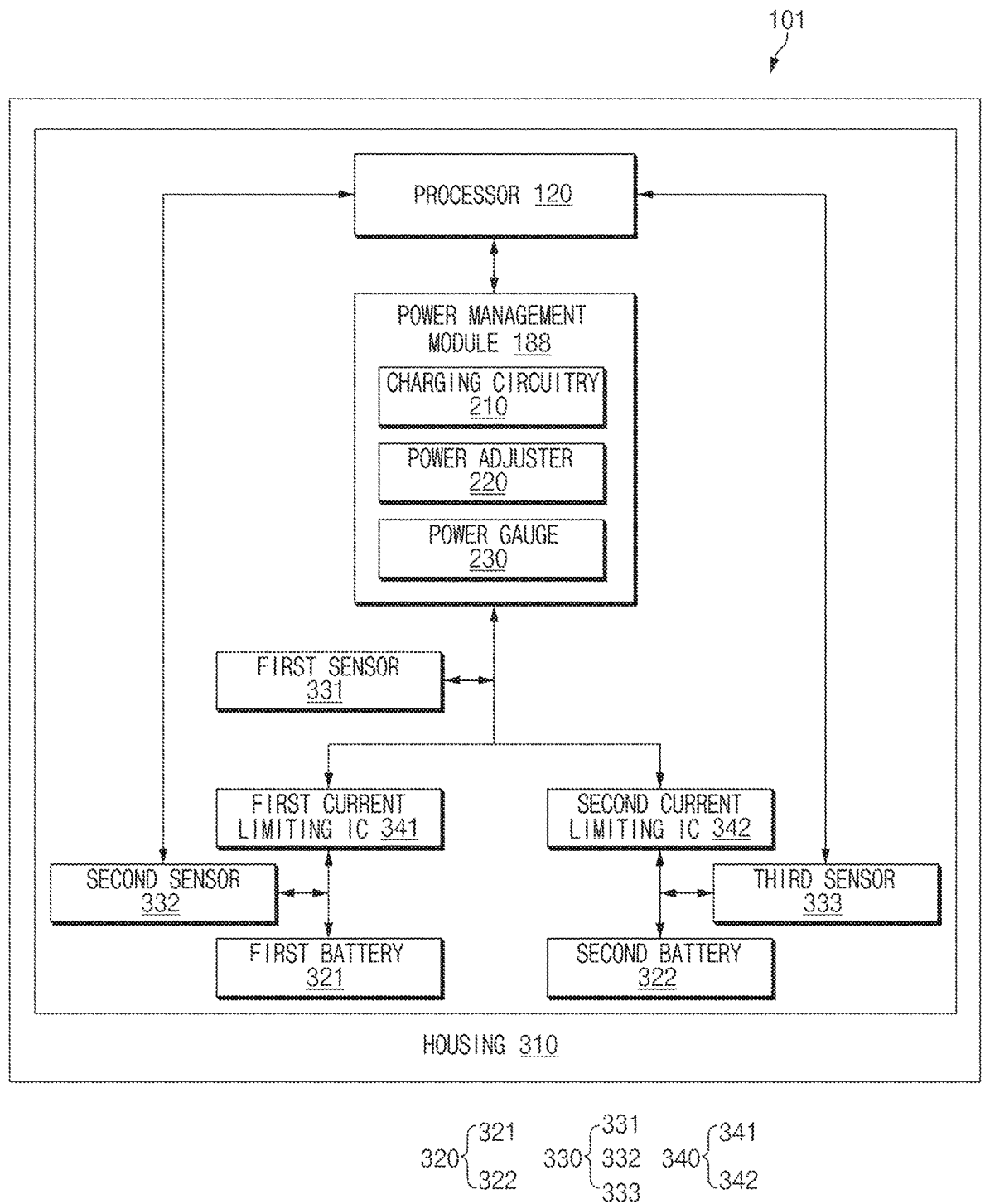
FIG. 3 is another block diagram illustrating an electronic device according to an embodiment of the disclosure.

FIG. 3 is another block diagram illustrating an electronic device according to an embodiment of the disclosure.

Referring to FIGS. 1, 2 and 3, the electronic device 101 (e.g., the electronic device 101 of FIG. 1) may include a plurality of batteries 320 and the power management module 188, a plurality of sensors 330, a plurality of current limiting ICs 340, and the processor 120, which are arranged in a housing 310.

In an embodiment, the housing 310 may define the appearance of the electronic device 101. The housing 310 may include a front plate that forms a front or first surface of the electronic device 101, a back plate that forms a back or second surface of the electronic device 101, and a side member that surrounds a space between the front plate and the back plate. The housing 310 may protect the plurality of batteries 320, the power management module 188, the plurality of sensors 330, the plurality of current limiting ICs 340, and the processor 120 from an external shock.

In an embodiment, the plurality of batteries 320 may be arranged in the housing 310. The plurality of batteries 320 may include a first battery 321 and a second battery 322. However, the embodiment is not limited thereto, and the plurality of batteries 320 may include three or more batteries. In this case, the electronic device 101 may operate as a multi-battery.

In an embodiment, each of the first and second batteries 321 and 322 may independently supply power required to operate the electronic device 101. Each of the first and second batteries 321 and 322 may be independently charged. Each of the first and second batteries 321 and 322 may have a different capacity. For example, the first battery 321 may be a main battery, and the second battery 322 may be a sub battery. Each of the first and second batteries 321 and 322 may be discharged at different rates.

In an embodiment, the first and second batteries 321 and 322 may perform a balancing operation to match the battery levels of each other. When the first and second batteries 321 and 322 perform the balancing operation, a difference in battery level between the first and second batteries 321 and 322 may be reduced.

In an embodiment, the power management module 188 may include the charging circuitry 210, the power adjuster 220, and the power gauge 230. The power management module 188 may be implemented as a power management integrated circuit (PMIC). The power management module 188 may control the plurality of batteries 320. For example, the power management module 188 may control the battery level of each of the first and second batteries 321 and 322. The power management module 188 may control the charging and/or discharging of each of the first and second batteries 321 and 322 to control the battery level of each of the first and second batteries 321 and 322. The power management module 188 may control the charging and/or discharging of each of the first and second batteries 321 and 322 by using the plurality of current limiting ICs 340.

In an embodiment, the plurality of sensors 330 may measure the current flowing through a specified portion and/or the voltage of a specified portion. The plurality of sensors 330 may include first to third sensors 331, 332 and 333.

In an embodiment, the plurality of current limiting ICs 340 may control the currents flowing into the plurality of batteries 320. The plurality of current limiting ICs 340 may limit the maximum intensity of the current flowing into each of the plurality of batteries 320. The plurality of current limiting ICs 340 may include a first current limiting IC 341 and a second current limiting IC 342. However, the disclosure is not limited thereto, and when the electronic device 101 operates with a multi-battery, the plurality of current limiting ICs 340 may include three or more current limiting ICs.

In an embodiment, the first sensor 331 may measure the total sum of the currents flowing from the power management module 188 to the plurality of batteries 320 and the total voltage of the plurality of batteries 320. FIG. 3 illustrates a case where the first sensor 331 is separately arranged. However, the disclosure is not limited thereto, and the first sensor 331 may be included in the power gauge 230. In this case, the power gauge 230 may measure the total sum of currents flowing into the plurality of batteries 320 and the total voltage of the plurality of batteries 320.

In an embodiment, the second sensor 332 may measure the current flowing into the first battery 321 and the voltage of the first battery 321. FIG. 3 illustrates a case where the second sensor 332 is separately arranged. However, the disclosure is not limited thereto, and the second sensor 332 may be included in the first current limiting IC 341. In this case, the first current limiting IC 341 may measure the current flowing into the first battery 321 and the voltage of the first battery 321.

In an embodiment, the third sensor 333 may measure the current flowing into the second battery 322 and the voltage of the second battery 322. FIG. 3 illustrates a case where the third sensor 333 is separately arranged. However, the disclosure is not limited thereto, and the third sensor 333 may be included in the second current limiting IC 342. In this case, the second current limiting IC 342 may measure the current flowing into the second battery 322 and the voltage of the second battery 322.

In an embodiment, the first current limiting IC 341 may limit the current flowing into the first battery 321. The first current limiting IC 341 may set the first battery 321 to a charging state or a discharging state. The first current limiting IC 341 may limit the maximum intensity of the current flowing from the power management module 188 into the first battery 321 in the charging state. The first current limiting IC 341 may limit the balancing operation between the first and second batteries 321 and 322 in the charging state. The first current limiting IC 341 may transmit, to the processor 120, information about the voltage of the first battery 321, the charging current flowing into the first battery 321, and/or the discharging current output from the first battery 321.

In an embodiment, the second current limiting IC 342 may limit the current flowing into the second battery 322. The second current limiting IC 342 may set the second battery 322 to a charging state or a discharging state. The second current limiting IC 342 may limit the maximum intensity of the current flowing from the power management module 188 into the second battery 322 in the charging state. The second current limiting IC 342 may limit the balancing operation between the first and second batteries 321 and 322 in the charging state. The second current limiting IC 342 may transmit, to the processor 120, information about the voltage of the second battery 322, the charging current flowing into the second battery 322, and/or the discharging current output from the second battery 322.

In an embodiment, the processor 120 is operationally connected to the plurality of batteries 320, the power management module 188, the plurality of temperature sensors 330, and the plurality of current limiting ICs 340. The processor 120 may obtain information about the plurality of batteries 320 through the charging circuitry 210 and the power gauge 230 of the power management module 188. For example, the processor 120 may know information about the sum of battery voltages, charging currents, discharging currents, and/or battery levels of the first and second batteries 321 and 322. The processor 120 may set the maximum intensities of the charging currents flowing into the first and second batteries 321 and 322 and/or whether to block the charging current.

In an embodiment, in the electronic device 101 to which a multi-battery structure is applied, each battery may be independently charged in a parallel structure, thereby causing a difference in charging time between batteries.

Figure 4:
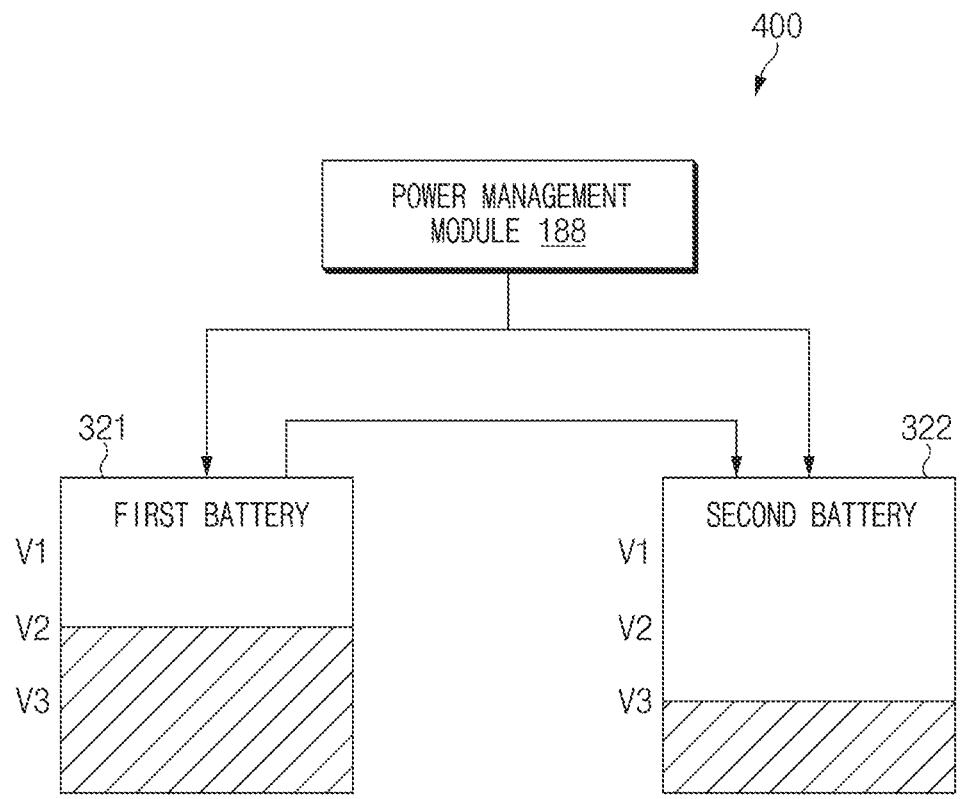
FIG. 4 is a view illustrating charging of first and second batteries according to an embodiment of the disclosure.

FIG. 4 is a view illustrating charging of first and second batteries according to an embodiment of the disclosure.

Referring to FIG. 4, block diagram 400 illustrates that the first and second batteries 321 and 322 may have a voltage lower than a first voltage V1, which is a fully charged voltage. The power management module 188 may set both the first and second batteries 321 and 322 to the charging state. The power management module 188 may allow charging currents to flow into the first and second batteries 321 and 322.

In an embodiment, the power management module 188 may set the sum of the first charging current I1 flowing from the charging circuitry 210 to the first battery 321 and the second charging current I2 flowing from the charging circuitry 210 into the second battery 322 to charge the first and second batteries 321 and 322. The first and second charging currents I1 and I2 flowing into the first and second batteries 321 and 322 may vary depending on the battery capacities of the first and second batteries 321 and 322.

In an embodiment, the power management module 188 may set the charging currents based on the capacities of the first and second batteries 321 and 322. The power management module 188 may set the charging currents to be less than or equal to the maximum currents allowed by the first and second batteries 321 and 322. The power management module 188 may set the charging currents such that the first and second batteries 321 and 322 are fully charged substantially at the same time. For example, when the capacity remaining until the first battery 321 is fully charged is a first capacity and the capacity remaining until the second battery 322 is fully charged is a second capacity, the power management module 188 may set the charging currents flowing into the first and second batteries 321 and 322 in proportion to the first capacity and the second capacity. The sum of the charging currents flowing into the first and second batteries 321 and 322 may be the sum of a first charging maximum set current that may flow into the first battery 321 and a second charging maximum set current that may flow into the second battery 322.

In an embodiment, a voltage difference may occur between the first and second batteries 321 and 322. According to an impedance state of each of the first and second batteries 321 and 322, the charging currents and the discharging currents of the first and second batteries 321 and 322 may be different from each other. For example, the first battery 321 may have a second voltage V2 lower than the first voltage V1, and the second battery 322 may have a third voltage V3 lower than the second voltage V2.

In an embodiment, current may flow from the first battery 321 having the second voltage V2 to the second battery 322 having the third voltage V3. Because the current flows from the first battery 321 having a high voltage to the second battery 322 having a low voltage, the battery cell balancing may occur in which the second battery 322 is charged and the first battery 321 is discharged. As the voltage difference between the first and second batteries 321 and 322 increases, the battery cell balancing may increase. When the battery cell balancing occurs between the first and second batteries 321 and 322, the lifespans of the first and second batteries 321 and 322 may be reduced, or the first battery 321 and the second battery 322 may deteriorate.

Figure 5:
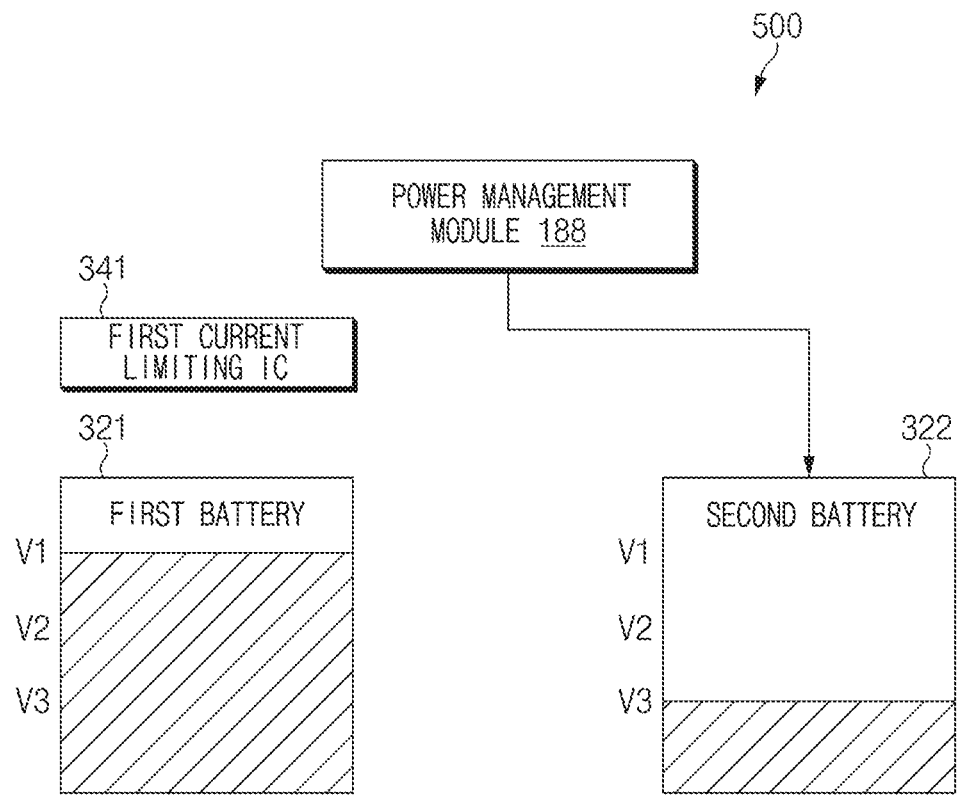
FIG. 5 is a view illustrating blocking of charging of a first battery, and charging of a second battery, according to an embodiment of the disclosure.

FIG. 5 is a view illustrating blocking of charging of a first battery, and charging of a second battery, according to an embodiment of the disclosure.

Referring to FIG. 5, block diagram 500 illustrates that the first battery 321 may have a first voltage V1 that is a fully charged voltage. The second battery 322 may have a third voltage V3 lower than the first voltage V1. A second voltage V2 is lower than the first voltage V1 in each. The first battery 321 may be in the fully charged state in which the voltage of the first battery 321 reaches the first voltage V1, which is the fully charged voltage, and the inflow of the charging current is blocked so that the first battery 321 is not charged. The second battery 322 may be in a charging state in which the second battery 322 has the third voltage V3 lower than the first voltage V1 which is the fully charged voltage, so that a charging current is introduced. The power management module 188 may measure the voltages of the first and second batteries 321 and 322. The power management module 188 may set each of the first and second batteries 321 and 322 to a fully charged state or a charging state based on the voltages of the first and second batteries 321 and 322. For example, the power management module 188 may set the first battery 321 to the fully charged state and set the second battery 322 to a charging state. The power management module 188 may block the charging current flowing into the first battery 321 by using the first current limiting IC 341 and introduce the charging current into the second battery 322.

In an embodiment, when minimizing battery cell balancing occurring between the first and second batteries 321 and 322 during charging of the first and second batteries 321 and 322, the lifespans of the first and second batteries 321 and 322 may be increased, and the first and second batteries 321 and 322 may be prevented from being deteriorated. The processor (e.g., the processor 120 of FIG. 3) may be configured to allow the first and second batteries 321 and 322 to be charged while minimizing the voltage difference between the first and second batteries 321 and 322 in order to minimize the battery cell balancing between the first and second batteries 321 and 322 during charging.

Figure 6:
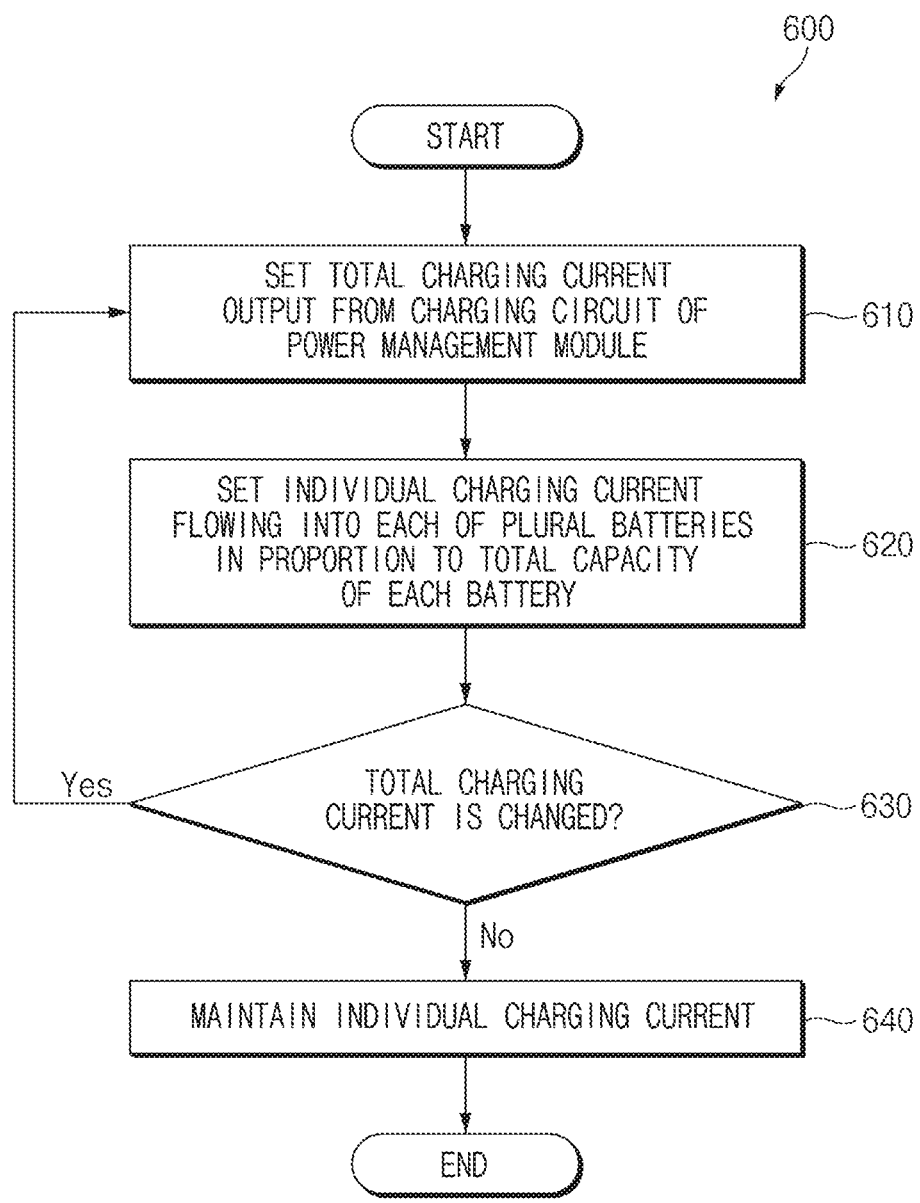
FIG. 6 is a flowchart illustrating a method of setting a charging current of each of a plurality of batteries according to an embodiment of the disclosure.

FIG. 6 is a flowchart illustrating a method of setting a charging current of each of a plurality of batteries (e.g., the first and second batteries 321 and 322 of FIG. 3) according to an embodiment of the disclosure.

Referring to FIG. 6, in operation 610 of flowchart 600, an electronic device (e.g., the electronic device 101 of FIG. 3) according to an embodiment may set a total charging current 'I' output from a charging circuitry (e.g., the charging circuitry 210 of FIG. 3) of a power management module (e.g., the power management module 188 of FIG. 3). For example, it is possible to set, as the total charging current 'I', the sum of the first charging current I1 flowing from the charging circuitry 210 to the first battery 321 and the second charging current I2 flowing into the second battery 322 in order to charging the electronic device 101 including the first and second batteries (e.g., the first and second batteries 321 and 322 of FIG. 3).

In an embodiment, the processor 120 may minimize the voltage difference between the first and second batteries 321 and 322 by setting the total charging current 'I' such that the initial current setting at the start of charging is optimized for the capacity.

In operation 620, the electronic device 101 according to an embodiment may set an individual charging current flowing into each of the plurality of batteries 321 and 322 in proportion to the total capacity of each of the batteries 321 and 322. For example, when the first battery 321 has the first capacity C1, the second battery 322 has the second capacity C2, and the total charging current 'I' is set, the first and second charging currents I1 and I2 may be set to be proportional to the first and second capacities C1 and C2.

In an embodiment, the first charging current I1 is a value obtained by multiplying a value obtained by dividing the first capacity C1 by the sum of the first and second capacities C1 and C2 by the total charging current 'I'. The second charging current I2 may be a value obtained by multiplying a value obtained by dividing the second capacity C2 by the sum of the first and second capacities C1 and C2 by the total charging current 'I'. For example, when the first battery 321 having the total capacity of 3,000 mAh and the second battery 322 having the total capacity of 2,000 mAh are charged with 2,500 mAh, the first charging current I1 and the second charging current I2 may be calculated as follows.

Total charging current 'I'=2,500 mA set in the charging circuitry 210

First charging current $I1=(3,000\text{mAh}/(3,000\text{mAh}+2,000\text{ mAh}))*2500\text{ mA}=1500\text{mAh}$ Second charging current $I2=(2,000\text{mAh}/(3,000\text{mAh}+2,000\text{mAh}))*2,500\text{ mA}=1,000\text{mAh}$ In an embodiment, the processor 120 may distribute the total charging current 'I' to be proportional to the total capacity of each of the first and second batteries 321 and 322, such that the first and second charging currents I1 and I2 flowing into the first and second batteries 321 and 322, respectively are set. The processor 120 may set the maximum current flowing into the first and second batteries 321 and 322 by using a distribution algorithm. The processor 120 may set the first and second charging currents I1 and I2 regardless of the current remaining capacities of the first and second batteries 321 and 322.

In operation 630, the electronic device 101 according to an embodiment may determine whether the total charging current 'I' has changed. The total charging current 'I' set at the charging circuitry 210 may vary in real time with various events such as a type of a connected charging cable, a heating control algorithm of the processor 120, a communication failure of a communication module (e.g., the communication module 190 of FIG. 1), a defect of the connected charging cable, defects of the first battery 321 and/or the second battery 322, or a poor charging state, or control of a user. The processor 120 may repeat operation 610 when the total charging current 'I' is changed (operation 630-Yes). When the total charging current 'I' is kept constant (operation 630-No), the processor 120 may proceed to operation 640.

In an embodiment, the processor 120 may recalculate the first and second charging currents I1 and I2 flowing into the first and second batteries 321 and 322 in real time whenever the total charging current 'I' set at the charging circuitry 210 is changed. The maximum charging current distribution algorithm of the processor 120 may be performed again whenever the total charging current 'I' set at the charging circuitry 210 is changed. The processor 120 may set the current flowing currently and actually in each of the first and second batteries 321 and 322 to be proportional to the total capacity of each of the first and second batteries 321 and 322 to control the voltages of the first and second batteries 321 and 322 to be substantially the same in the charging operation.

In operation 640, the electronic device 101 according to an embodiment may maintain an individual charging current. The processor 120 may maintain the first and second charging currents I1 and I2. The processor 120 may be configured to allow the first and second batteries 321 and 322 to receive the total charging current 'I' divided by capacity. The processor 120 may maintain the intensities of the first and second charging currents I1 and I2 flowing into the first and second batteries 321 and 322, respectively while the total charging current 'I' is kept constant. In the processor 120, the processor 120 may minimize the charging imbalance between the first and second batteries 321 and 322 by allowing the total charging current 'I' set at the charging circuitry 210 to flow a little more into one of the first or second battery 321 or 322.

Figure 7:
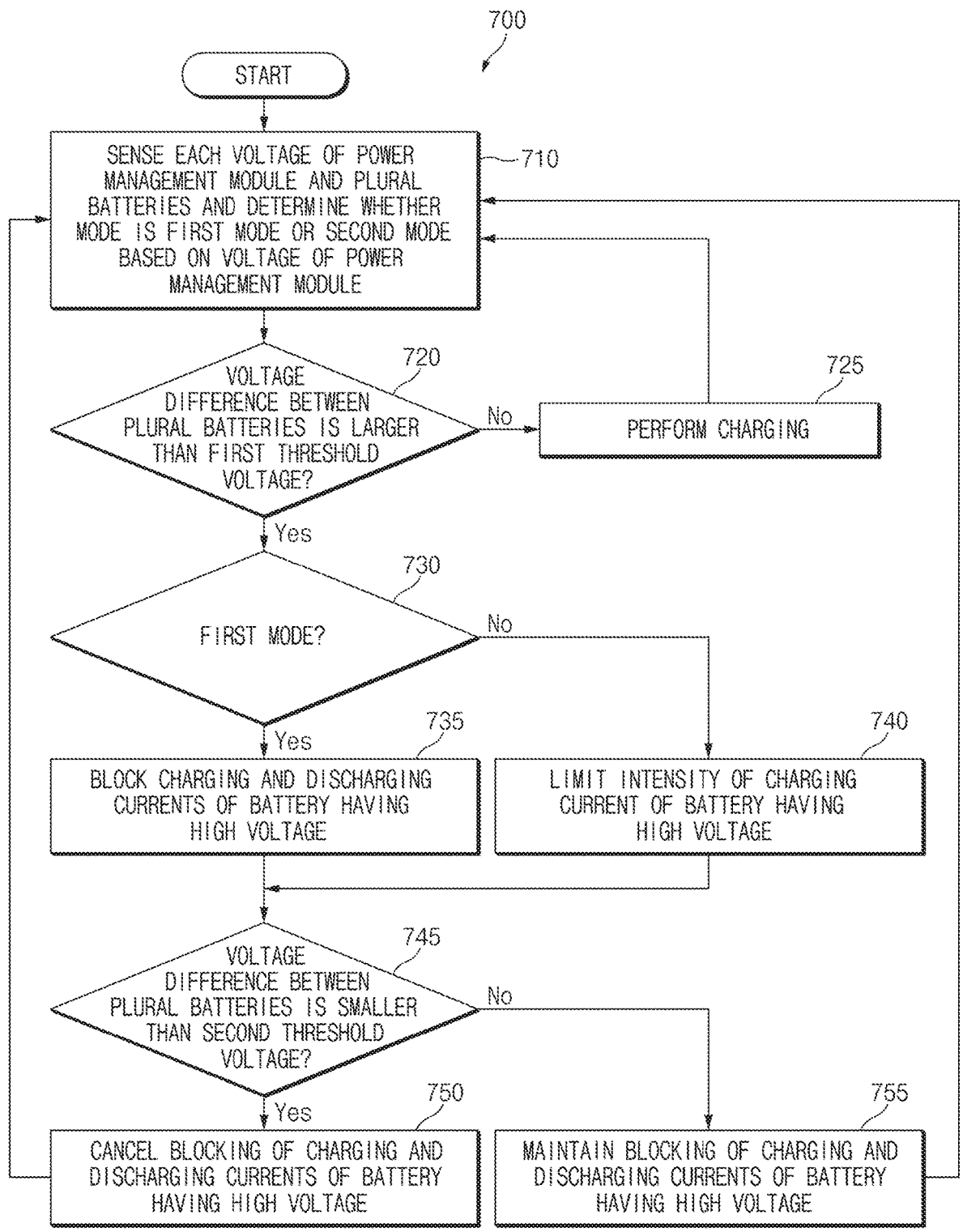
FIG. 7 is a flowchart illustrating a method of charging a plurality of batteries according to an embodiment of the disclosure.

FIG. 7 is a flowchart illustrating a method of charging a plurality of batteries (e.g., the first and second batteries 321 and 322 of FIG. 3) according to an embodiment of the disclosure.

Referring to FIG. 7, a method of minimizing battery cell balancing may be applied on the assumption that the first and second batteries 321 and 322 are in a charging state. When the discharging current is blocked due to the battery cell balancing by using a plurality of current limiting ICs (e.g., the first and second current limiting ICs 341 and 342 of FIG. 3) in a discharging state, the current output itself from the first and second batteries 321 and 322 may be blocked. In this case, the system current required for the operation of the electronic device 101 may be insufficient, so that the operation of the electronic device 101 may stop. The processor 120 may be set to allow a method of minimizing a voltage difference between the first and second batteries 321 and 322 to be applied only in the charging operation.

In operation 710 of flowchart 700, the electronic device 101 according to an embodiment may sense a voltage of each of the power management module (e.g., the power management module 188 of FIG. 3) and the batteries 321 and 322, and may determine whether the mode is the first mode or the second mode based on the voltage of the power management module 188.

In an embodiment, the charging of the first and second batteries 321 and 322 may begin when there is imbalance between the voltages of the first and second batteries 321 and 322. The processor 120 may sense the voltage of the charging circuitry 210 of the power management module 188, the voltage of the first battery 321, and the voltage of the second battery 322.

In an embodiment, the processor 120 may determine whether the mode is the first mode that is a constant voltage (CV) mode or the second mode that is a constant current (CC) mode based on the voltage of the charging circuitry 210 of the power management module 188. The processor 120 may control the charging speed of the first or second battery 321 or 322 to perform balanced charging between the first and second batteries 321 and 322 depending on which of the first and second modes. The processor 120 may attempt to reduce the voltage difference between the first and second batteries 321 and 322 in the first mode and to increase the charging speed of the first and second batteries 321 and 322 in the second mode. The processor 120 may determine whether to reduce the voltage difference or increase the charging speed in terms of the current total charging capacities of the first and second batteries 321 and 322.

In operation 720, the electronic device 101 according to an embodiment may determine whether each voltage difference between the plurality of batteries 321 and 322 is greater than a first threshold voltage. The processor 120 may check whether the voltage difference between the first and second batteries 321 and 322 is large. When the voltage difference between the first and second batteries 321 and 322 is greater than the first threshold voltage (operation 720-Yes), the processor 120 may define the current state as a battery imbalance state in which the voltage difference between the first and second batteries 321 and 322 is large. The processor 120 may proceed to operation 730 when the voltage difference between the first and second batteries 321 and 322 is greater than the first threshold voltage (operation 720-Yes). When the voltage difference between the first battery 321 and the second battery 322 is smaller than the first threshold voltage (operation 720-No), the processor 120 may define the current state as the battery balance state in which the voltage difference between the first and second batteries 321 and 322 is small. When the voltage difference between the first and second batteries 321 and 322 is smaller than the first threshold voltage (operation 720-No), the processor 120 may proceed to operation 725.

The electronic device 101 according to an embodiment may perform charging in operation 725. When the batteries are in a balanced state, it is not necessary to perform an operation of reducing the voltage difference between the first and second batteries 321 and 322 during charging. The processor 120 may determine that the voltage difference between the first and second batteries 321 and 322 is within a normal range and perform normal charging.

The electronic device 101 according to an embodiment may determine whether the electronic device is in the first mode in operation 730. The first mode may be a mode in which the charging voltage is kept constant because the voltage of the power management module 188 is equal to or greater than a specified ratio compared to the fully charged voltage. The second mode may be a mode in which the charging current is kept constant because the voltage of the power management module 188 is equal to or less than a specified ratio compared to the fully charged voltage. The processor 120 may prioritize minimizing battery cell balancing in the first mode. The processor 120 may prioritize a fast charging time of all the first and second batteries 321 and 322 in the second mode. The processor 120 may perform operation 735 when the processor 120 is in the first mode (operation 730-Yes). The processor 120 may perform operation 740 when the processor 120 is in the second mode (operation 730-No).

In operation 735, the electronic device 101 according to an embodiment may block a charging current and a discharging current of a battery having a high voltage (for example, the first battery 321). When the voltage of the first battery 321 among the first and second batteries 321 and 322 is large, the processor 120 may block the charging current to prevent the charging current from flowing into the first battery 321. When the processor 120 is in the first mode, the processor 120 may stop charging the first battery 321 and charge only the second battery 322 to quickly reduce the voltage difference between the first and second batteries 321 and 322. For example, the processor 120 may set the first current limiting IC (e.g., the first current limiting IC 341 of FIG. 3) to a supplement mode which is a mode of blocking current, thereby blocking the current flowing into the first battery 321. The processor 120 may be set to block the charging current and the discharging current of the first battery 321 for a specified time.

In an embodiment, the processor 120 may block the discharging current output from the first battery 321 by using the first current limiting IC 341. The processor 120 may block the discharging current of the first battery 321 to prevent the first battery 321 from being discharged due to the occurrence of the battery cell balancing by which a current flows toward the second battery 322 having a lower voltage than the first battery 321.

In an embodiment, the system current required by the electronic device 101 may be supplied from the second battery 322. The processor 120 may control the power management module 188 to supply the system current from an external charging device such that the system current is not short.

In operation 740, the electronic device 101 according to an embodiment may limit the intensity of a charging current of a battery having a high voltage. When the voltage of the first battery 321 among the first and second batteries 321 and 322 is high, the processor 120 may limit the charging current flowing into the first battery 321 to a predetermined size or less. In the second mode, the processor 120 may allow the second battery 322 to be charged while limiting the charging of the first battery 321 such that the voltage difference may be gradually reduced while the first and second batteries 321 and 322 are rapidly charged as a whole. When the voltage of the charging circuitry 210 of the power management module 188 is in the second mode, the processor 120 may constantly limit the current flowing into the first battery 321 because the overall charging of the first and second batteries 321 and 322 may be slow when the charging of the first battery 321 having a high voltage is blocked. The processor 120 may be set to limit the intensity of the charging current of the first battery 321 for a specified time.

In an embodiment, the processor 120 may set the maximum charging current which is the maximum current with that the first and second batteries 321 and 322 can be charged without being damaged. The processor 120 may block the charging current to the first battery 321 having a high voltage in the first mode or limit the intensity of the charging current to the first battery 321 having a high voltage in the second mode, such that the charging current of the second battery 322 may be prevented from exceeding the maximum charging current to prevent the second battery 322 from being damaged. The second battery 322 may maintain the maximum charging current to catch up with the voltage of the first battery 321.

In operation 745, the electronic device 101 according to an embodiment may determine whether the difference between the voltages of the first battery 321 and the second battery 322 is smaller than the second threshold voltage. The processor 120 may determine whether the voltage difference between the first and second batteries 321 and 322 has decreased after a specified time has elapsed since the charging current of the first battery 321 having the high voltage is limited. When the voltage difference between the first and second batteries 321 and 322 is smaller than the second threshold voltage (operation 745-Yes), the processor 120 may define it as a battery balance state. When the voltage difference between the first and second batteries 321 and 322 is less than the second threshold voltage (operation 745-Yes), the processor 120 may proceed to operation 750. When the voltage difference between the first and second batteries 321 and 322 is greater than the second threshold voltage in operation 745 (No), the processor 120 may define it as a battery imbalance state. When the voltage difference between the first and second batteries 321 and 322 is greater than the second threshold voltage (operation 745-No), the processor 120 may proceed to operation 755.

In operation 750, the electronic device 101 according to an embodiment may cancel blocking of the charging and discharging currents of the first battery 321 having the high voltage. Because of the return to the battery balance state, the processor 120 may perform charging in a general manner. After performing operation 750, the processor 120 may be configured to perform operation 710 every specified time period.

In operation 755, the electronic device 101 according to an embodiment may maintain blocking of charging and discharging currents of the first battery 321 having the high voltage. The processor 120 may determine that the first and second batteries 321 and 322 are in an imbalanced state, and perform charging while the voltages of the first and second batteries 321 and 322 similarly match each other. After performing operation 755, the processor 120 may be configured to perform operation 710 every specified time period.

In an embodiment, the processor 120 may select one charging control method depending on whether the balance charging in the first mode and the second mode prioritizes minimizing battery cell balancing or charging time. Both charging control methods may proceed until the voltage levels of the first and second batteries 321 and 322 are similar to each other. The processor 120 may adjust the voltages of the first and second batteries 321 and 322 to be similar to each other by allowing the first and second batteries 321 and 322 to perform balanced charging.

Figure 8:
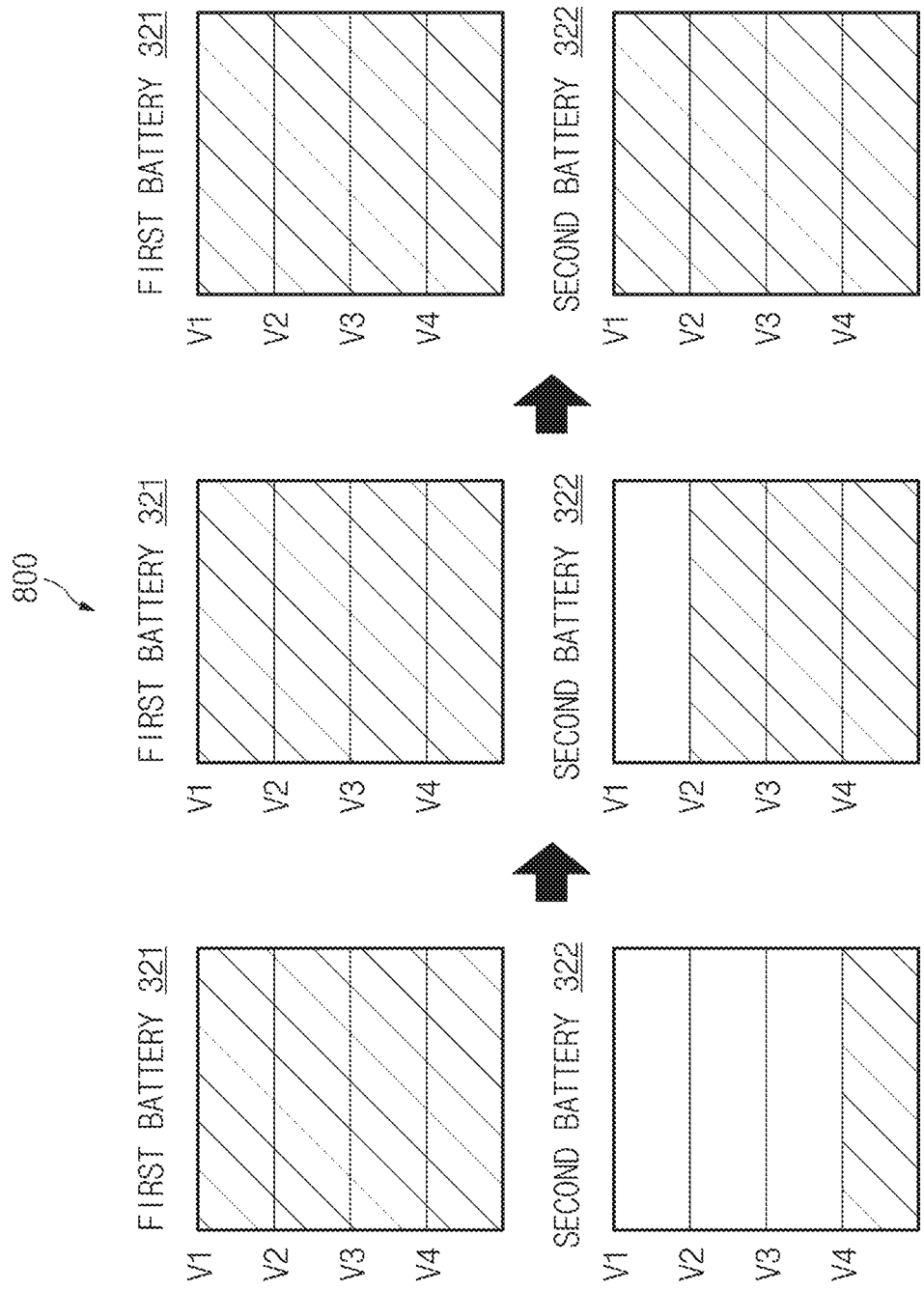
FIG. 8 is a view illustrating a method of charging a plurality of batteries in a first mode according to an embodiment of the disclosure.

FIG. 8 is a view illustrating a method of charging a plurality of batteries in a first mode according to an embodiment of the disclosure.

Referring to FIG. 8, block diagrams 800 illustrate that the first battery 321 may have a higher voltage than the second battery 322. The initial voltage of the first battery 321 may be a first voltage V1 that is a fully charged voltage or a target voltage. The initial voltage of the second battery 322 may be a fourth voltage V4. For example, the first voltage V1 may be about 100%, and the fourth voltage V4 may be about 25%. In this case, the voltage of the charging circuit (e.g., the charging circuitry 210 of FIG. 3) of the power management module (e.g., the power management module 188 of FIG. 3) may be in the range of about 80% to about 90%. The processor 120 may perform the charging in the first mode based on the fact that the voltage of the power management module 188 is close to the fully charged voltage or the target voltage.

In an embodiment, the processor 120 may block both the charging current flowing into the first battery 321 and the discharging current flowing from the first battery 321 to the second battery 322. The processor 120 may control the power management module 188 such that the power management module 188 charges only the second battery 322. The power management module 188 may charge the second battery 322 to raise the voltage of the second battery 322 to the first voltage V1 through second and third voltages V2 and V3. Accordingly, the voltage difference between the first and second batteries 321 and 322 may be reduced or eliminated.

Figure 9:
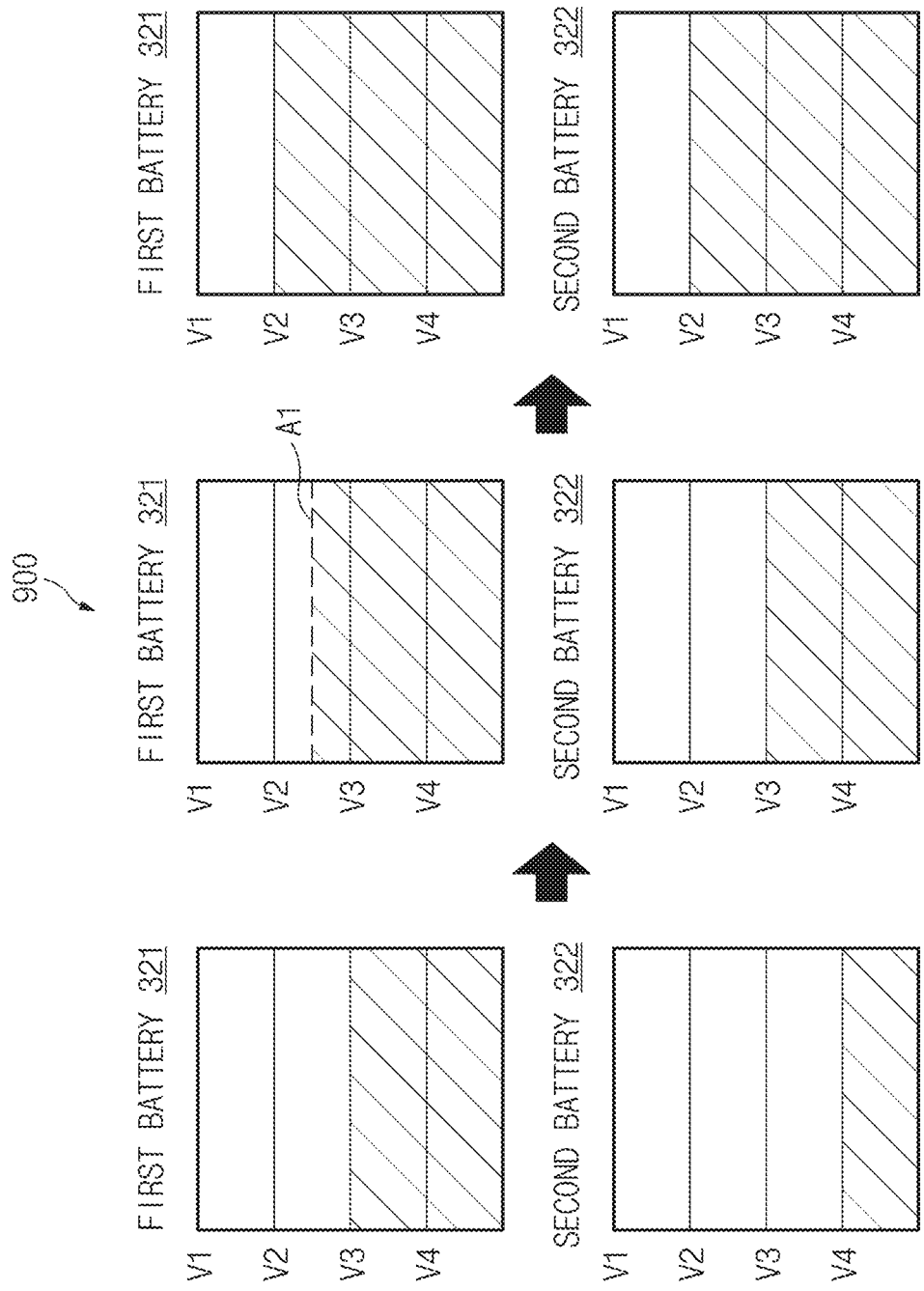
FIG. 9 is a view illustrating a method of charging a plurality of batteries in a second mode according to an embodiment of the disclosure.

FIG. 9 is a view illustrating a method of charging a plurality of batteries in a second mode according to an embodiment of the disclosure.

Referring to FIG. 9, block diagrams 900 illustrate that the first battery 321 may have a higher voltage than the second battery 322. The initial voltage of the first battery 321 may be a third voltage V3 which is a voltage lower than the fully charged voltage or the target voltage. The initial voltage of the second battery 322 may be a fourth voltage V4. For example, the third voltage V3 may be about 50%, and the fourth voltage V4 may be about 25%. In this case, the voltage of the charging circuit (e.g., the charging circuitry 210 of FIG. 3) of the power management module (e.g., the power management module 188 of FIG. 3) may be in the range of about 30% to about 40%. The processor 120 may perform charging in the second mode based on the fact that the voltage of the power management module 188 is lower than the fully charged voltage or the target voltage.

In an embodiment, the processor 120 may limit the intensity of the charging current flowing into the first battery 321. For example, the processor 120 may limit the first charging current flowing into the first battery 321 to be smaller than the second charging current flowing into the second battery 322. In this case, when charging is performed in the power management module 188, while the voltage of the second battery 322 rises from the fourth voltage V4 to the third voltage V3, the voltage of the first battery 321 may not rise from the third voltage V3 to the second voltage V2, but may rise to a first intermediate voltage A1 between the second and third voltages V2 and V3. Thereafter, the power management module 188 may charge the first and second batteries 321 and 322 such that the voltage of the first battery 321 also rises to the second voltage V2 at the time point when the voltage of the second battery 322 rises to the second voltage V2. Accordingly, the voltage difference between the first and second batteries 321 and 322 may be reduced or eliminated.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, each of the plurality of batteries may receive a charging current distributed corresponding to its capacity to minimize the voltage difference between the plurality of batteries.

In addition, according to the embodiments of the disclosure, charging may be performed while the voltage difference generated between the plurality of batteries is reduced, thereby minimizing a decrease in battery lifespan caused by battery cell balancing during charging.

In addition, various effects that are directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a plurality of batteries arranged in the housing;
   a power management circuit configured to control the plurality of batteries;
   a plurality of current limiting integrated circuits (ICs) configured to limit a maximum intensity of a current flowing into the plurality of batteries, respectively; and
   at least one processor operationally connected to the plurality of batteries, the power management circuit, and the plurality of current limiting ICs,
   wherein the at least one processor is configured to:
      set a total charging current output from the power management circuit,
      set individual charging currents flowing into each of the plurality of batteries, respectively, in proportion to a total capacity of each of the plurality of batteries regardless of current remaining capacities of the plurality of batteries,
      after setting both the total charging current output from the power management circuit and the individual charging currents flowing into each of the plurality of batteries, determine whether the total charging current set has changed, and
      based on determining that the total charging current changed after being set, recalculate the individual charging currents.

2. The electronic device of claim 1, wherein the at least one processor is further configured to:
   set a maximum current to be introduced into each of the plurality of batteries in proportion to the total capacity of each of the plurality of batteries and a total maximum current set in the power management circuit.

3. The electronic device of claim 1, wherein the at least one processor is further configured to:
   prevent a current larger than a maximum current that the total capacity of each battery is accommodatable from being introduced into each of the plurality of batteries.

4. The electronic device of claim 1, further comprising:
   a first sensor configured to sense a sum of at least one of currents flowing into the plurality of batteries or a voltage of the power management circuit; and
   second and third sensors configured to sense at least one of a current or a voltage of each of the plurality of batteries,
   wherein the at least one processor is further configured to:
      set the total charging current by using the first sensor, and
      set the individual charging currents by using the second and third sensors.

5. The electronic device of claim 4,
   wherein the first sensor is included in the power management circuit,
   wherein the second sensor is included in a first current limiting IC among the plurality of current limiting ICs, and
   wherein the third sensor is included in a second current limiting IC among the plurality of current limiting ICs.

6. The electronic device of claim 1, wherein the at least one processor is further configured to:
   distribute the total charging current to the plurality of batteries by capacity, and
   in response to the total charging current being maintained, maintain an intensity of the individual charging currents.

7. An electronic device comprising:
   a housing;
   a plurality of batteries arranged in the housing;
   a power management circuit configured to control the plurality of batteries;
   a plurality of current limiting integrated circuits (ICs) configured to limit a maximum intensity of a current flowing into the plurality of batteries, respectively; and
   at least one processor operationally connected to the plurality of batteries, the power management circuit, and the plurality of current limiting ICs,
   wherein the at least one processor is configured to:
      sense a voltage of the power management circuit and a voltage of each of the plurality of batteries,
      based on the voltage of the power management circuit, determine whether a mode the electronic device is in is a first mode in which voltages of the plurality of batteries are kept constant or a second mode in which a current is kept constant, wherein the mode is determined based on a result of comparing the voltage of the power management circuit to a specified ratio, and
      in response to a voltage difference occurring while the plurality of batteries are being charged, control a charging current of a battery having a higher voltage among the plurality of batteries corresponding to whether the mode is the first mode or the second mode, and
   wherein the at least one processor is further configured to:

determine the electronic device is in the first mode based on the voltage of the power management circuit being equal to or greater than the specified ratio, and determine the electronic device is in the second mode based on the voltage of the power management circuit being less than the specified ratio.

8. The electronic device of claim 7, wherein the at least one processor is further configured to:

block the charging current and a discharging current of the battery having the higher voltage to prevent battery cell balancing between the plurality of batteries in the first mode.

9. The electronic device of claim 7, wherein the at least one processor is further configured to:

limit an intensity of the charging current of the battery having the higher voltage to increase charging speeds of all of the plurality of batteries in the second mode.

10. The electronic device of claim 7, wherein the at least one processor is further configured to:

in response to each voltage difference between the plurality of batteries being greater than a first threshold voltage after sensing the voltage of each of the plurality of batteries, charge the plurality of batteries.

11. The electronic device of claim 7, wherein the at least one processor is further configured to:

in response to each voltage difference between the plurality of batteries being less than a second threshold voltage after a specified time has elapsed since the controlling of the charging current of the battery having the higher voltage, terminate the controlling of the charging current of the battery having the higher voltage.

12. The electronic device of claim 7, wherein the at least one processor is further configured to:

block the charging current of the battery having the higher voltage by setting a current limiting IC connected to the battery having the higher voltage among the plurality of current limiting ICs to a supplement mode.

13. The electronic device of claim 7, wherein the at least one processor is further configured to:

keep a charging current of a battery having a lower voltage among the plurality of batteries constant at a maximum charging current that is able to be charged without being damaged.

14. The electronic device of claim 7, wherein, in the first mode, the at least one processor is further configured to:

block the charging current and a discharging current of the battery having the higher voltage, and control the power management circuit to supply a system current required by the electronic device from a battery having a lower voltage among the plurality of batteries and an external charging device.

15. The electronic device of claim 7, wherein, in the second mode, the at least one processor is further configured to:

charge the plurality of batteries, and control the power management circuit to limit an intensity of the charging current of the battery having the higher voltage among the plurality of batteries.

16. The electronic device of claim 1, wherein the at least one processor is further configured to:

in response to a voltage of the power management circuit being equal to or greater than a specified ratio compared to a fully charged voltage, which is a voltage of at least one battery of the plurality of batteries when the at least one battery is in a fully charged state, control the power management circuit to maintain a charging voltage at a constant value, and wherein the maintained charging voltage is configured to minimize battery balancing.

17. The electronic device of claim 1, wherein the at least one processor is further configured to:

in response to a voltage of the power management circuit being equal to or less than a specified ratio compared to a fully charged voltage, which is a voltage of at least one battery of the plurality of batteries when the at least one battery is in a fully charged state, control the power management circuit to maintain a charging current at a constant value, and wherein the maintained charging current is configured to minimize charging time.

18. The electronic device of claim 1, wherein the total charging current set changes in real time with various events such as a type of a connected charging cable, a heating control algorithm of the at least one processor, a communication failure of a communication circuit, a defect of the connected charging cable, defects of at least one of the plurality of batteries, a poor charging state, or control of a user.

19. The electronic device of claim 1, wherein the at least one processor is further configured to:

set, as the total charging current, a sum of a first charging current flowing from the power management circuit to a first battery and a second charging current flowing from the power management circuit to a second battery, and set a first charging current for charging the first battery and a second charging current for charging the second battery, wherein the first charging current is obtained by multiplying the total charging current set with a value obtained by dividing a total capacity of the first battery with a sum of total capacities of each of the plurality of batteries, and wherein the second charging current is obtained by multiplying the total charging current set with a value obtained by dividing a total capacity of the second battery with a sum of total capacities of each of the plurality of batteries.

* * * * *